United States Patent [19]

Bell et al.

[11] Patent Number: 4,504,509

[45] Date of Patent: Mar. 12, 1985

[54] LIQUID BATTER FOR COATING FOODSTUFFS AND METHOD OF MAKING SAME

[75] Inventors: Harvey Bell, Martinsville; Julianne M. Lenchin, Plainsboro; Gary A. Zwiercan, Califon, all of N.J.

[73] Assignee: National Starch & Chem. Corp., Bridgewater, N.J.

[21] Appl. No.: 402,429

[22] Filed: Jul. 28, 1982

[51] Int. Cl.$^3$ .............................. A21D 10/00
[52] U.S. Cl. ................... 426/549; 426/552; 426/553; 426/653; 426/661; 426/302
[58] Field of Search ............... 426/552–555, 426/549, 293, 289, 302, 661, 578; 536/103, 106; 424/180

[56] References Cited

U.S. PATENT DOCUMENTS

| | | | |
|---|---|---|---|
| 3,052,549 | 9/1962 | Ducharme et al. | 426/549 |
| 3,904,601 | 9/1975 | Tessler et al. | 426/578 |
| 3,956,515 | 5/1976 | Moore et al. | 426/549 |
| 3,970,767 | 7/1976 | Tessler et al. | 426/661 |

Primary Examiner—Raymond Jones
Assistant Examiner—Elizabeth A. King
Attorney, Agent, or Firm—James & Franklin

[57] ABSTRACT

A liquid batter for use in coating foodstuffs prior to cooking comprising a blend of a substantially ungelatinized, highly crosslinked, high amylose starch and water. The batter may be processed aseptically and stored for months.

26 Claims, No Drawings

LIQUID BATTER FOR COATING FOODSTUFFS AND METHOD OF MAKING SAME

BACKGROUND OF THE INVENTION

The present invention relates to a liquid batter for coating foodstuffs and a method of making same, and more particularly to such a liquid batter which has been aseptically processed.

Batters to be used for coating foodstuffs, such as chicken, prior to cooking have long been available in either frozen form or dried powder form. However, due to the microbial spoilage during storage, even regrigerated storage (about 35°–45° F.), such batters could not be stored in liquid form. The conventional aseptic processing procedures involving heating (e.g., heat sterilization which would normally prevent such microbial spoilage during storage of the liquid batter) could not be used with the available liquid batter. Such batters contained large quantities of ungelatinized starch, the starch, in its ungelatinized state, being a necessary ingredient of the batter for proper application of the batter to foodstuffs (i.e., coatability), and the heating during such conventional aseptic processing would cause the starch to gelatinize, thereby rendering the batter unacceptable from the point of view of coatability as well as increasing its viscosity to the point where it could not be processed aseptically on a commercial scale.

Ideally, such a liquid batter should have a high solids content so as to minimize batter spattering during cooking of the coated foodstuffs. This is especially important when the coated foodstuff is being fried, as a batter with a low solids level or low viscosity tends to release moisture in the form of spattering when it hits the hot oil. The batter should also have a sufficently low viscosity so that it can be processed aseptically. On the other hand, the batter must have a sufficiently high viscosity to provide suspension of the other ingredients of the batter. Finally, the batter must have good adhesion properties at all times (prior to, during, and after cooking) so that it adheres to the foodstuffs, preferably with at least 70% and optimally at least 85% of the foodstuff initially adherent to the foodstuff prior to cooking remaining on the foodstuff after cooking.

Accordingly, it is an object of the present invention to provide a flowable batter (that is, a batter in liquid form) for use in coating foodstuffs, such as chicken, the batter being storable under either room temperature or refrigerated conditions, without microbial spoilage.

Another object is to provide such a batter which has a sufficiently low viscosity to enable easy aseptic processing during manufacture as well as a sufficiently high viscosity to maintain the ingredients of the batter in suspension.

A further object is to provide such a batter which has a high solids content to reduce batter spattering during cooking of the coated foodstuff, good film-forming characteristics and good adhesion properties.

Still a further object is to provide such a batter which is aseptically processed.

A final object is to provide a method of preparing such a batter.

SUMMARY OF THE INVENTION

It has now been found that the above and related objects of the present invention are obtained in an aseptically processed liquid batter for use in coating foodstuffs prior to cooling comprising a blend or mixture of a substantial ungelatinized, highly crosslinked, high amylose starch, and water, the batter having a Brookefield viscosity of 1,000–5,000 cps (preferably in excess of 1,500 cps) at 80° F. and a solids content of 60%.

Preferably the starch has an amylose content of at least 55%, with 70% by weight being most preferred. An especiallly preferred starch is high amylose corn starch. The starch is preferably crosslinked by reaction with phosphorus oxychloride or like agents, and has a viscosity of less than 100 Brabender units after being held for 20 minutes at 95° C. and less than 550 Brabender units after then cooling to 30° C.

The mixture preferably includes a maltose-free starch dextrin, tapioca dextrin being especially preferred for this purpose. Generally the batter comprises 20 to 85 parts by weight of water, 10 to 35 parts of the starch, and 2 to 35 parts of the dextrin.

When the batter is to be used in coating foodstuffs prior to frying thereof, a preferred embodiment comprises 30–85% by weight of water, 10–35% of the starch, 2–35% of the maltose-free starch dextrin, 1–20% of oil, 0.3–3% of emulsifier, and 0.1–3% of yeast. Where the batter is to be used in coating foodstuffs prior to baking thereof, a preferred embodiment comprises 20–60% by weight of water, 10–35% of the starch 10–35% of the maltose-free starch dextrin, 5–25% of oil, 0.3–3% of emulsifier, 0.1–3% of yeast, and 5–20% of maltodextrin.

The invention further comprises a method of preparing the aseptic liquid batter by forming a blend of the starch and water and then aseptically processing the blend to prepare an aseptic batter having the aforementioned Brookfield viscosity.

The invention still further comprises a liquid batter comprising a blend of the starch, a maltose-free starch dextrin and water.

The batter is characterized by a viscosity low enough to enable processing to render it aseptic, but high enought to maintain the ingredients in suspension. After aseptic processing, the batter preferably has a Brookfield viscosity of 1,000–5,000 cps at 80° F. and a solids content of 60%.

DETAILED DESCRIPTION OF THE PREFERRED EMBODIMENTS

The batter of the present invention comprises a blend or mixture of a substantially ungelatinized, highly cross-linked, high amylose starch and water. The first ingredient, the ungelatinized starch, preferably has an amylose content of at least 55%, with an amylose content of at least 70% by weight being especially preferred. Starches of lower amylose content will tend to gelatinize during aseptic processing, thereby increasing the viscosity of the mixture to a level where it is insufficiently flowable for further processing on a commercial scale. While any starch meeting the high amylose starch requirement may be utilized, it has been found that high amylose corn starch is especially suitable for the practice of the present invention. An especially preferred high amylose corn starch is that sold by National Starch and Chemical Corporation of Bridgewater, New Jersey, under the trademark HYLON VII. Of course, the starch employed need not be a natural starch, but may be a high amylose fraction of a starch obtained according to procedures well known in the starch art.

In addition to being substantially ungelatinized and of high amylose content, the first ingredient must also be highly crosslinked. In order to crosslink the starch, it is ordinarily necessary to react the starch with a polyfunctional crosslinking agent. These include: aliphatic dihalides such as propylene dichloride, dichloropentane, ethylene dibromide, glycerol dichlorohydrin and dichlorobutane; ether forming epoxy halogen compounds such as epichlorohydrin and epibromohydrin; certain polyfunctional reagents such as cyanuric chloride, phosphorus oxychloride, metaphosphates and polymetaphosphates; aldehydes such as formaldehyde and formaldehyde-containing resins and prepolymers; succinic anhydride; and mixtures of adipic or citric acid with acetic anhydride. In general, these crosslinking agents may be defined as compounds containing at least two functional groups which can react with at least two available hydroxy groups of the starch molecule or molecules and thus alter the cooking characteristics of the resulting starch product. While the starch may be crosslinked using any such edible crosslinking agents well recognized in the art, phosphorus oxychloride (POCl$_3$) is preferred as other crosslinking agents must typically be used in such great quantities to achieve the same high level of crosslinking as to be either uneconomical or contrary to U.S. Food and Drug Administration regulations.

Where the starch has not been highly crosslinked, the product lacks sufficient heat resistance to withstand the elevated temperatures encountered in the aseptic processing. The high levels of crosslinking assists in maintaining the starch granules in a largely unswollen or ungelatinized state despite the high temperature aseptic processing.

With respect to the actual crosslinking of the starches, we refer to a number of U.S. patents relating to various processes. These include U.S. Pat. No. 2,500,950, which covers the use of dihalides and epoxy halogen compounds; U.S. Pat. No. 2,805,220, which covers the use of cyanuric chloride; U.S. Pat. No. 2,801,242, which covers the use of mixtures of meta and polymetaphosphates; U.S. Pat. No. 2,461,139, which covers the use of succinic anhydride as well as mixtures of adipic or citric acid with acetic anhydride; and U.S. Pat. No. 2,328,537, which covers the use of phosphorus oxychloride.

In the crosslinking reaction using the preferred crosslinking agent of phosphorus oxychloride, the starch is reacted with the phosphorus oxychloride in the ratio of 100 parts of starch to 0.05-0.1 parts of phosphorus oxychloride. Under typical phosphorus oxychloride crosslinking reaction conditions about 80-90% of the phosphorus oxychloride is believed to undergo reaction within about two hours at 80°-82° F. at a pH of 12.0. The degree of crosslinking may be monitored by viscosity measurements taken on the starch. For example, using a VISCO/AMYLO/GRAPH type VA-1B device equipped with a 350 centimeter-gram cartridge, 36 grams of anyhydrous starch are combined with sufficient water to total 100 grams. The mixture is stirred well, and 500 grams of a 40% aqueous calcium chloride solution are added with stirring (the solution also containing 0.6% sodium acetate). The mixture is immediately poured into a Brabender cup, heated rapidly to 95° C. and held at that temperature for twenty minutes. A first viscosity measurement is made at this point. The mixture is then cooled to 30° C. at the rate of 1.5° C. per minute, and a second viscosity measurement is taken at this point. The preferred suitably crosslinked starches have a viscosity of less than 100 Brabender units after being held for twenty minutes at 95° C. (the first measurement) and less that 550 Brabender units after subsequent cooling to 30° C. (the second measurement).

Thus, the starch ingredient of the batter contributes to an appropriate batter viscosity, on the one hand, enabling the other batter ingredients to remain in suspension without settling, and, on the other hand, retarding gelatinization during aseptic processing so that the starch is maintained in its appropriate raw form for proper application to the foodstuff.

While the batter according to the present invention may contain just water and starch, preferred embodiments of the batter include at least five additional ingredients: a maltose-free starch dextrin, an oil, an emulsifier, a protein, and seasoning.

The maltose-free starch dextrin is preferably a tapioca dextrin. While other maltose-free dextrins, such a corn starch dextrin or potato starch dextrin may be employed, these other dextrins tend to provide an off-taste to the final product. An especially preferred tapioca dextrin is that sold by National Starch and Chemical Corporation of Bridgewater, N.J., under the designation K-4484. The maltose-free dextrin ingredient increases the solids content of the batter to a high level so as to reduce the batter spattering tending to occur during frying of the coated foodstuff. It also promotes a desirable crispiness and limited glassiness in the final baked product. The maltose-free dextrin ingredient furthermore contributes to the adherent film-forming properties of the batter so that the coating adheres to the foodstuff throughout cooking (either baking or frying) without flaking off. Most importantly, it accomplishes all this without greatly increasing the final batter viscosity or causing carmelization or excessive browning during cooking.

Higly suitable batters according to the present invention may be made essentially from the above-described ingredients. Generally a highly suitable batter comprises of 10-35 parts of the starch ingredient, 2-35 parts of the dextrin ingredient, and 20-85 parts by weight of water. For example, a batter comprising 25 parts of the starch ingredient, 35 parts of the dextrin ingredient, and 40 parts of water produces a satisfactory "fried" batter.

The batter for baking preferably contains 10-35 parts by weight of the starch ingredient, 10-35 parts of the dextrin ingredient, and 20-60 parts of water; while the batter for frying preferably contains from 10-35 parts by weight of the starch ingredient, 2-35 parts of the dextrin ingredient and 30-85 parts of water. Lower water levels are used in the "baking" batter relative to the "frying" batter in order to reduce run-off of the "baking" batter from the foodstuff during the prolonged baking period. During baking there is less tendency for the batter to become glassy and more tackiness of the batter is desirable; hence higher levels of the dextrin ingredient than those used for frying are preferred. Where greater amounts of the starch ingredient are employed, the batter lacks the high solids contents necessary to minimize batter spattering during frying and the final fried coating lacks good film-forming capabilities and tends to flake off the foodstuff. Where greater amounts of the dextrin ingredient are employed, during frying the outer coating of the batter may carmelize, lose opacity and become gummy or glassy.

Turning now to the other ingredients of the preferred embodiments, the oil is preferably vegetale oil, although any of the edible fats or shortenings generally encompassed by the term "oil" may be utilized instead. The oil gives the final cooked batter crispiness, a deep-fried characteristic, and generally improves the taste. Generally about 1 to 25 parts of oil are employed, with 1–20 parts being preferred for the "frying" batter and 5–25 parts being preferred for the "baking" batter. Less oil is incorporated in the "frying" batter because, during frying of the foodstuff coated with the "frying" batter, some of the cooking oil added to the fry pan becomes incorporated in the final "fried" batter.

The emulsifier may be any of the edible emulsifiers generally employed in the food industry, a preferred emulsifier being a dry emulsifier (such as that comprised of 80 parts of emulsifier on 20 parts of a sodium caseinate carrier and sold by Food Industries, Ltd., of Wirral, Mercyside, England under the trademark ADMUL 2230). The emulsifier should have good starch complexing properties so that it retards the incidence of gelling or heavy viscosity development during aseptic processing of the batter. The emulsifier not only assists in the incorporation of the oil into the batter, but also promotes formation of a pliable outer coating exhibiting less glassiness. Preferably 0.3–3.0 parts of emulsifier are employed, regardless of whether the batter is to be used for frying or baking.

The protein is preferably an edible yeast (such as a torula yeast sold by Amoco Chemicals Corporation of Chicago, Illinois, under the trademark TORUTEIN 94). The yeast increases the solids level of the batter without increasing the final viscosity thereof, aids in browning of the batter during cooking, and decreases the brittleness or glassiness of the cooked batter. Preferably from 0.1 to 3.0 parts of the yeast are employed, regardless of whether the batter is to be fried or baked.

The seasoning may be any of the conventional edible seasonings or flavorings appropriate for the foodstuff to be coated with the batter. Preferably about 2.8 parts of seasoning are employed, regardless of whether the batter is to be fried or baked.

The preferred embodiment of the "baked" batter further includes a maltodextrin (such as that available from the Grain Processing Company under the trademark MALTRIN 10). The maltodextrin promotes browning of the batter during baking as well as increasing the solids contents of the batter without affecting the viscosity of the batter or unduly sweetening it. It also reduces the glassiness, chewiness, and carmelization of the final cooked product. The maltodextrin is not particularly useful in the "fried" batter as the frying of the "fried" batter provides sufficient browning without the use of the maltodextrin. Preferably 5–20 parts of the maltodextrin are employed. Higher levels of maltodextrin result in carmelization and excessive browning of the cooked batter. Where a sweet-tasting batter is acceptable, dextrose or glucose may be employed in place of the maltodextrin.

During aseptic processing, the batter is subjected to a combination of temperature and pressure sufficient to destroy the bacteria therein and thereby permitting the batter to be stored under either room temperature or refrigerated (35–45° F.) conditions for several months. The combinations of temperature and pressure effective for this purpose are well known in the art and encompass a range including 300 seconds at 250° F., or 1.8 seconds at 290° F. Preferred combinations include 230°–285° F. for 4.6 seconds or 275° F. for 15 seconds. After aseptic processing, the batter has a Brookfield viscosity (HAF) of 1,000–5,000 cps measured using a #2 spindle @ 5 rpm at a temperature of 80° F. and a solids content of 60% (preferably a viscosity in excess of 1,500 cps), thereby insuring that the ingredients will not settle out even after prolonged storage, while still permitting further processing and insuring good coatability.

The batters are preferably manufactured for sale with water levels of 20 to 60% (35% being especially preferred) for the "baked" batter and 30–85% (65.5% by weight being especially preferred) for the "fried" batter. Obviously, however, lower water levels may be employed where the batter is to be sold as a concentrate.

The following examples illustrate the efficacy of the present invention. All parts and percentages are by weight unless otherwise indicated.

EXAMPLE I

This example illustrates the preparation and use of especially preferred batters for frying and baking.

In order to prepare the highly cross-linked starch, 100 parts of ungelatinized, high amylose corn starch (HYLON VII) were dispersed in 150 parts of water with 30 parts of sodium sulphate (to prevent swelling of the starch and thereby promote crosslinking), 1.5 parts of sodium hydroxide (to adjust the pH), and 0.1 parts of phosphorus oxychloride (the crosslinking agent). The reaction proceeded for about two hours at 80°–82° F. at a pH of 12.0. The crosslinked starch had a viscosity of 25 Brabender units after being held at 95° C. for 20 minutes and 70 Brabender units after being subsequently cooled to 30° C. at a rate of 1.5° C. per minute.

The especially preferred batters for the "baked" and "fried" batter mixes are set forth in Table I.

TABLE I

| PREFERRED BATTERS | | | |
|---|---|---|---|
| INGREDIENTS | "BAKED" BATTER PARTS | "FRIED" BATTER PARTS | |
| Water | 35.0 | 65.5 | 68.0 |
| Crosslinked starch | 19.5 | 17.9 | 16.1 |
| Tapioca dextrin (NATIONAL K-4484) | 17.8 | 5.9 | 5.3 |
| Maltodextrin (MALTRIN 10) | 10.0 | — | — |
| Vegetable oil | 12.0 | 5.0 | 5.0 |
| Emulsifier (ADMUL 2230) | 2.1 | 2.1 | 2.1 |
| Yeast (TORUTEIN 94) | 0.8 | 0.8 | 0.8 |
| Seasoning | 2.8 | 2.8 | 2.8 |
| | 100.0 | 100.0 | 100.0 |

In order to prepare the batters, the water and emulsifier were blended together, with mixing, at 110° F. for five minutes. The vegetable oil was added, and the blend was mixed for an additional ten to fifteen minutes at 110° F. All the other dry ingredients (including the crosslinked starch, tapioca dextrin, yeast, seasoning and, for the "baked" batter, maltodextrin) were dry blended together and added to the slurry at 110° F. The slurry was then heated to 150° F. with constant mixing and held there, also with constant mixing, for ten to fifteen minutes.

The batter was then processed aseptically by heating it with constant recirculation to 275° F. in an aseptic processing system (available from the Contherm Corporation of Newburyport, Massachusetts under the trademark CONTHERM 6X3) and holding it at that temperature for 15 seconds. The resultant batters had Brookfield viscosities (MOdel HAF) in excess of 1,500 cps when measured at 80° F. and a solids content of 60%.

During storage, there was little, if any, settling out of the batter ingredients and no oil separation.

To use the "baked" batter, two tablespoons of all-purpose flour (about 24 grams) were added to each 500 grams of batter to further enhance its adhesion and opacity. The chicken pieces were then moistened, dipped into the batter, and placed in a pan that was lightly greased to prevent sticking. The coated foodstuff was then baked at 375° F. for 40-45 minutes. (If desired, the moistened surface of the chicken part may be pre-dusted with wheat or all-purpose flour to enhance adhesion of the coating to the chicken part during baking).

To use the "fried" batter mix, the chicken parts were dipped into the batter and then placed into a skillet pre-heated to 375° F. and containing about one inch of vegetable oil. The coated foodstuff was then fried for a half hour with constant flipping.

During cooking, whether baking or frying, the batter exhibited little, if any, spattering and adhered satisfactorily to the foodstuffs, over 70% by weight of the initially adherent batter remaining adherent after cooking.

After cooking the batter was in the form of a somewhat pliable, but crisp, opaque film, exhibiting a desirable taste, good adhesion to the foodstuff, and a desirable level of browning, with little, if any, brittleness, carmelization, chewiness or gumminess.

EXAMPLE II

This example illustrates the necessity of using a highly crosslinked starch in the preparation of the batter of the present invention.

Various specimens of crosslinked starches were prepared according to the procedure set forth at the beginning of Example I, but using varying amounts of phosphorus oxychloride per 100 parts of the ungelatinized high amylose corn starch (HYLON VII). The crosslinked starches were then used to prepare "fried" aseptic batters according to the formula of Table I and evaluated for coatability on chickens with the results reported in Table II.

TABLE II

| POCl₃, PARTS | Viscosity of Starch Brabender Units | | Brookfield Viscosity of Batter, cps. 80° F., 60% solids | Coatability of Batter |
| --- | --- | --- | --- | --- |
| | 95° C. + 20 min. | 30° C. | | |
| 0.02 | 300 | 1035 | 7200 | Too viscous |
| 0.04 | 140 | 570 | 5200 | Too viscous |
| 0.06 | 50 | 245 | 2720 | good |
| 0.08 | 30 | 105 | 1840 | good |
| 0.10 | 10 | 30 | 1520 | good |

For the crosslinked starch, Brabender viscosities of less than 100 Brabender units (after being held for 20 minutes at 95° C.) and less than 550 Brabender units (after subsequent cooling to 30° C. at a rate of 1.5 °C. per minute) produced the batters most suitable for coating, that is, those having a Brookfield viscosity (HAF) of 1,000-5,000 cps, preferably above 1,500 cps, at 80° F. and 60% solids.

To summarize, the present invention provides a flowble liquid batter which is storable for prolonged period of time under either room temperature or refrigerated conditions. The batter has a sufficiently low viscosity to enable easy aseptic processing during manufacture as well as a sufficiently high viscosity to maintain the ingredients of the batter in suspension even during prolonged storage. The batter has good film-forming characteristics, good adhesion characteristics, and a sufficiently high solids content to reduce spattering during cooking.

Now that the preferred embodiments of the present invention have been described in detail, various modifications and improvements thereon will become readily apparent to those skilled in the art. For example, while the batter has been described primarily in the context of a coating for chicken, it will be obvious that it may also be used for coating prior to cooking a variety of other foodstuffs such as fish, fruit, etc. Accordingly, the spirit and scope of the present invention is to be limited only by the appended claims, and not by the foregoing disclosure.

We claim:

1. An aseptically processed liquid batter for use in coating foodstuffs prior to cooking, said batter having been aseptically processed by a combination of temperature and pressure sufficient to destroy the bacteria therein and permit room temperature storage, said batter comprising a blend of a substantially ungelatinized starch and water; said starch having an amylose content of at least 55% and being highly crosslinked to a level enabling the starch granules to remain in the substantially ungelatinized state through aseptic processing, said batter having a Brookefield viscosity of 1,000-5,000 cps as measured at 80° F. and a solids content of 60%.

2. The batter of claim 1 wherein said blend further comprises a starch dextrin.

3. The batter of claim 1 wherein said starch is high amylose corn starch.

4. The batter of claim 1 wherein said blend further comprises a maltose-free starch dextrin.

5. The batter of claims 1 or 4 wherein said starch has an amylose content of at least 70%.

6. The batter of claims 1 or 4 wherein said starch is crosslinked by reaction with phosphorus oxychloride.

7. The batter of claim 6 wherein 100 parts of said starch is crosslinked by reaction with 0.05-0.1 parts of phosphorus oxychloride.

8. The batter of claims 1 or 4 wherein said starch has a viscosity of less than 100 Brabender units after being held for 20 minutes at 95° C. and less than 550 Brabender units after then cooling to 30° C.

9. The batter of claims 1 or 4 wherein said batter has a Brookfield viscosity greater than 1,500 cps.

10. The batter of claim 4 wherein said maltose-free starch dextrin is tapioca dextrin.

11. The batter of claim 4 comprising 20 to 85 parts of water, 10 to 35 parts of said stretch, and 2 to 35 parts by weight of said maltose-free starch dextrin.

12. The batter of claim 11 for use in coating foodstuffs prior to frying comprising 30-85% of water, 10-35% of said starch, 2-35% of said maltose-free starch dextrin, 1-20% of oil, 0.3-3.0% of emulsifier, and 0.1-3.0% by weight of yeast.

13. The batter of claim 11 for use in coating foodstuffs prior to baking comprising 20-60% water, 10-35% of said starch, 10-35% of said maltose-free starch dextrin, 5-25% of oil, 0.3-3.0% of emulsifier, 0.1-3.0% of yeast, and 5-20% of maltodextrin.

14. A method for preparing an aseptically processed liquid batter for use in coating foodstuffs prior to cooking comprisng the steps of (A) forming a blend of a substantially ungelatinized starch and water, said starch having an amylose content of at least 55% and being highly crosslinked to a level enabling the starch granules to remain in the substantially ungelatinized state through aseptic processing; and (B) aseptically processing said blend by a combination of temperature and pressure sufficient to destroy the bacteria therein and permit room temperature storage to prepare an aseptic batter having a Brookfield viscosity of 1,000–5,000 cps as measured at 80° F. and a solids content of 60%.

15. The method of claim 14 wherein said batter has a Brookfield viscosity greater than 1,500 cps.

16. The method of claim 14 wherein said starch has a viscosity of less than 100 Brabender units after being held for 20 minutes at 95° C. and less than 550 Brabender units after then cooling to 30° C.

17. The method of claim 14 wherein said starch is high amylose corn starch.

18. The method of claim 14 wherein said starch has an amylose content of at least 70%.

19. The method of claim 14 wherein said starch is crosslinked by reaction with phosphorus oxychloride.

20. The method of claim 19 wherein 100 parts said starch is crosslinked by reaction with 0.05–0.1 parts of phosphorus oxychloride.

21. The method of claim 14 wherein said blend further comprises a starch dextrin.

22. The method of claim 21 wherein said starch dextrin is a maltose-free dextrin.

23. The method of claim 22 wherein said maltose-free starch dextrin is tapioca dextrin.

24. The method of claim 22 comprising 20 to 85 parts of water, 10 to 35 parts of said starch, and 2 to 35 parts by weight of said maltose-free starch dextrin.

25. The method of claim 24 for use in coating foodstuffs prior to frying comprising 30–85% of water, 10–35% of said starch, 2–35% of said maltose-free starch dextrin, 1–20% of oil, 0.3–3.0% of emulsifier, and 0.1–3.0% by weight of yeast.

26. The method of claim 24 fo use in coating foodstuffs prior to baking comprising 20–60% water, 10–35% of said maltose-free starch dextrin, 5–25% of oil, 0.3–3.0 of emulsifier, 0.1–3.0% of yeast, and 5–20% of maltodextrin.

* * * * *